United States Patent
Chang et al.

(10) Patent No.: US 9,460,649 B2
(45) Date of Patent: Oct. 4, 2016

(54) TIMING CONTROLLER FOR IMAGE DISPLAY AND ASSOCIATED CONTROL METHOD

(71) Applicant: MStar Semiconductor, Inc., Hsinchu Hsien (TW)

(72) Inventors: Qi-Xin Chang, Zhubei (TW); Jian-Kao Chen, Zhubei (TW); Yung Chang, Hsinchu (TW); Chen-Nan Lin, Taipei (TW); Chung-Ching Chen, Zhubei (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 222 days.

(21) Appl. No.: 14/476,819

(22) Filed: Sep. 4, 2014

(65) Prior Publication Data
US 2015/0062138 A1    Mar. 5, 2015

(30) Foreign Application Priority Data
Sep. 4, 2013 (TW) .............................. 102131860 A

(51) Int. Cl.
| G06F 13/372 | (2006.01) |
| G09G 3/20 | (2006.01) |
| G09G 3/36 | (2006.01) |
| G06T 1/60 | (2006.01) |

(52) U.S. Cl.
CPC ........... *G09G 3/2092* (2013.01); *G09G 3/3611* (2013.01); *G06T 1/60* (2013.01); *G09G 2320/0252* (2013.01); *G09G 2340/16* (2013.01); *G09G 2370/08* (2013.01); *G09G 2370/14* (2013.01)

(58) Field of Classification Search
CPC ...................................................... G06T 1/60
See application file for complete search history.

(56) References Cited

U.S. PATENT DOCUMENTS

| 6,538,648 B1* | 3/2003 | Koike .................... G09G 5/005 345/213 |
| 9,214,117 B2* | 12/2015 | Sasaki .................. G09G 3/3607 |
| 2010/0110097 A1* | 5/2010 | Nam .................... G09G 3/3426 345/589 |
| 2011/0122163 A1 | 5/2011 | Suzuki et al. |
| 2011/0156780 A1* | 6/2011 | Kang ..................... H03L 7/095 327/158 |
| 2013/0002620 A1* | 1/2013 | Du ......................... G09G 3/003 345/204 |

FOREIGN PATENT DOCUMENTS

| TW | 200632772 A | 9/2006 |
| TW | 200802248 A | 1/2008 |
| TW | 201113856 A | 4/2011 |

OTHER PUBLICATIONS

Taiwan Office Action, Apr. 17, 2015, 6 pages.

\* cited by examiner

*Primary Examiner* — Charles Tseng
(74) *Attorney, Agent, or Firm* — Edell, Shapiro & Finnan, LLC

(57) ABSTRACT timing controller for a panel display system includes: an image signal receiver that receives an image signal; an overdrive circuit that receives and converts the image signal from the image signal receiver according to successive first frame data and second frame data in the image signal; an image signal transmitter that receives the converted image signal from the overdrive circuit and transmits the same to a display panel; a memory; and a memory interface unit. In a normal read/write period, the memory interface unit receives the first frame data from the overdrive circuit and stores the same in the memory, and fetches the first frame data from the memory when the overdrive circuit receives the second frame data in the image signal and transmits the same to the overdrive circuit. The memory interface unit further obtains sampling results to generate a preferred delay phase.

16 Claims, 4 Drawing Sheets

TIMING CONTROLLER FOR IMAGE DISPLAY AND ASSOCIATED CONTROL METHOD

This application claims the benefit of Taiwan application Serial No. 102131860, filed Sep. 4, 2013, the subject matter of which is incorporated herein by reference.

BACKGROUND OF THE INVENTION

1. Field of the Invention

The invention relates in general to an image display apparatus, and more particularly to a timing controller for image display and an associated control method.

2. Description of the Related Art

FIG. 1 shows a schematic diagram of a panel display system 100. An image signal 112 outputted from a display controller 110 first enters a timing controller 120. The timing controller 120 converts the image signal 112 to a converted image signal compliant to a predetermined specification according to a display panel 130 having various specifications.

The converted image signal 122 includes gate driving signals of gate drivers and source driving signals of source drivers on the display panel 130 as well as various synchronization signals. The synchronization signals include a horizontal synchronization signal and a vertical synchronization signal. According to data signals between two pulses of the horizontal synchronization signal, data signals outputted from the source drivers may display an image of one display line on the display panel 130. Similarly, according to data signals between two pulses of the vertical synchronization signal, the data signals outputted from the source drivers may display an image of one frame on the display panel. In other words, the display panel 130 displays an image according to the converted image signal generated by the timing controller 120.

The transmittance of liquid crystals in the display panel 130 is determined by rotational angles of the liquid crystals, and the rotational angles of the liquid crystals in pixels are controlled by the source signals in the converted image signal 122. However, as the rotational speeds of liquid crystals are rather slow, an overdrive circuit is designed in the timing controller 120. One main purpose of the overdrive circuit is to compare image differences of two successive frames to modify the source signals in the converted image signal in the aim of accelerating the rotational speeds of liquid crystals in pixels to provide a sharper display image.

When the panel display system 100 presents a display image, the image signal 110 generated by the display controller 110 is constantly inputted into the timing controller 120, which also constantly outputs the converted image signal. To better compare differences between two successive frames in real-time, the overdrive circuit needs to be connected to a memory that temporarily stores data of the previous frame (a first frame). Only when the data of the current frame (a second frame) is inputted into the overdrive circuit, the overdrive circuit can then compare the images in the two successive frames in real-time to generate the converted image signal 122.

As the data of the current frame (the second frame) is temporarily stored in the memory, the data of the previous frame (the first frame) is deleted. When the data of a next frame (a third frame) in the image signal 112 enters the overdrive circuit, the same operation is repeated.

However, if the timing controller 120 encounters signal drifts between the memory and the overdrive circuit, the overdrive circuit will access erroneous data from the memory. As such, the converted image signal 122 outputted will result in an image glitch or even an image crash.

Some reasons causing signal drifts are manufacturing process drifts, voltage drifts or temperature variations, i.e., commonly referred to as a process voltage temperature (PVT) effect.

During a multi-chip package process of memories, due to slight differences in memories made by different memory manufacturers, signal mismatch between memory interfaces may be resulted. Hence, a conventional solution may fail to identify an optimal phase for accessing frame data from a memory.

In a worse scenario, when the timing controller 120 experiences electrostatic discharge (ESD), the data that the timing controller 120 fetches from the memory may be changed into erroneous data, to even crash the panel display system 100 in severe situations.

SUMMARY OF THE INVENTION

The invention is directed to a timing controller for a panel display system and an associated control method that effectively controls the signal quality between a memory and an overdrive circuit in the timing controller, thereby allowing the timing controller to operate reliably.

A timing controller for a panel display system is provided by the present invention. The timing controller, which may be coupled between a display controller and a display panel, includes: an image signal receiver, configured to receive an image signal outputted from the display controller; an overdrive circuit, configured to receive the image signal, and to generate a converted image signal according to successive first frame data and second frame data in the image signal; and image signal transmitter, configured to receive the converted signal outputted from the overdrive signal and to transmit the converted signal to the display panel; a memory; and a memory interface unit. In a normal read/write period, the memory interface receives the first frame data outputted from the overdrive circuit and temporarily stores the first frame data in the memory. When the overdrive circuit receives the second frame data in the image signal, the memory interface unit fetches the first frame data from the memory according to a preferred delay phase and transmits the first frame data to the overdrive circuit. In a memory calibration period, the memory interface unit adjusts a delay phase of the a reference clock a number of times, accordingly samples a read signal outputted from the memory to obtain a plurality of sampling results, and determines the preferred delay phase according to the sampling results.

A control method for a timing controlled for a panel display system is provided. The method, applied to a memory interface unit in the timing controller, includes: writing test data to a memory in a memory calibration period; delaying a reference clock by a plurality of delay phases to generate a plurality of delayed reference clocks, respectively; obtaining a plurality of sampling results by sampling the read data outputted from the memory according to the delayed reference clocks, respectively; comparing the sampling results with the test data to obtain a plurality of comparison results; and determining a preferred delay phase according to the comparison results.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
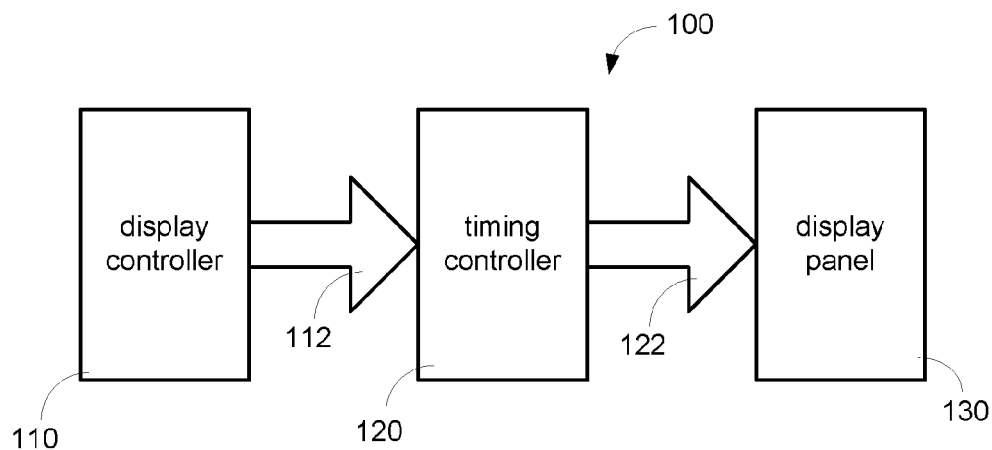
FIG. 1 is a schematic diagram of a panel display system.
Figure 2:
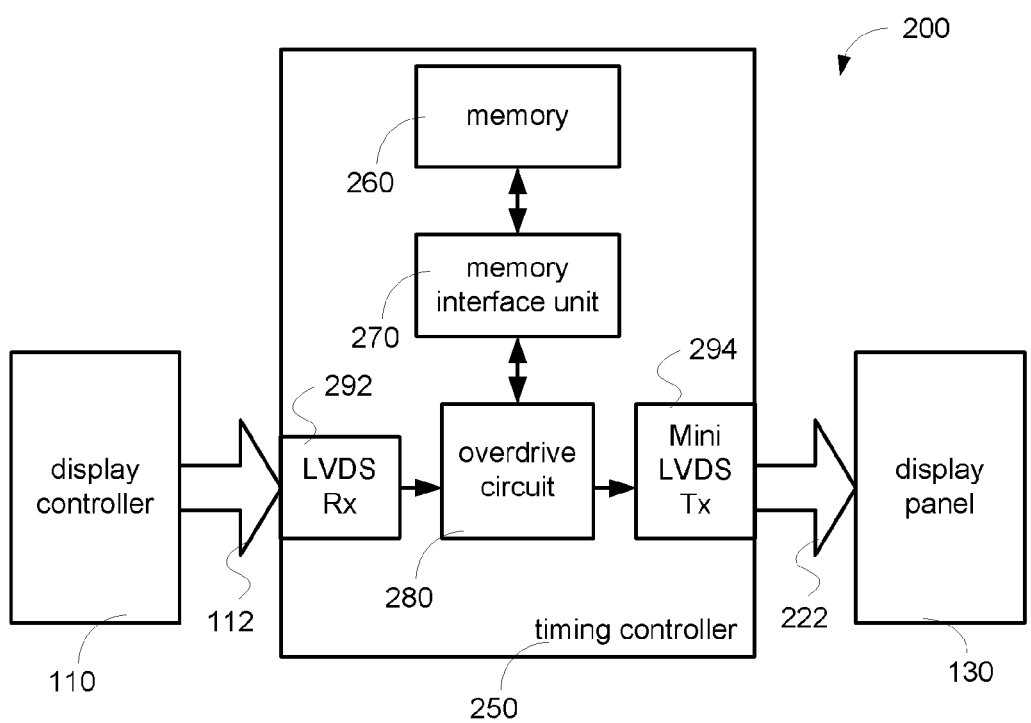
FIG. 2 is a schematic diagram of a panel display system according to an embodiment of the present invention.

FIG. 2 shows a schematic diagram of a panel display system 200 according to an embodiment of the present invention. An image signal 112 outputted from a display controller 110 is inputted into a timing controller 250. The timing controller 250 converts the received image signal 112 to a converted image signal 222 compliant to a predetermined specification according to display panels in various specifications. The converted image signal 222 includes gate driving signals of gate drivers and source driving signals of source drivers on a display panel 130, as well as a horizontal synchronization signal and a vertical synchronization signal.

The timing controller 250 includes a low-voltage differential signaling (LVDS) receiver 292, an overdrive circuit 280, a mini-low-voltage differential signaling (mini-LVDS) transmitter 294, a memory interface unit 270, and a memory 260. In the embodiment, the image signal 112 that the display controller 110 outputs to the LVDS receiver 292 is an LVDS image signal; the converted signal 222 that the mini-LVDS transmitter 294 outputs the display panel is a mini-LVDS converted image signal.

In the embodiment, the overdrive circuit 280 constantly compares two successive sets of frame data in the image signal 112 and generates the converted image signal. Data of a previous frame (a first frame) in the image signal is temporarily stored in the memory 260, and is fetched and transmitted by the memory interface unit 270 to the overdrive circuit 280. When a current frame (a second frame) is inputted into the overdrive circuit 280, the overdrive circuit 280 compares images in the two successive frames to generate the converted image signal 222 compliant to a predetermined specification.

When data of the current frame (the second frame) is temporarily stored in the memory 260 via the memory interface unit 270, data of the previous frame (the first frame) is deleted. Similarly, when a next frame (a third frame) enters the overdrive circuit 280, the same operation is repeated to generate the converted image signal 222.

In the prior art, in the timing controller 280, the overdrive circuit 280 is much likely to experience a PVT effect, ESD or other events, such that the frame data in the memory cannot be accessed or become erroneous. As such, the converted image signal 222 outputted from the overdrive 280 may become problematic to lead to an image glitch or an image crash.

To allow the overdrive circuit 280 to output the correct converted image signal 222, the memory interface unit 270 needs to ensure the correctness of the frame data fetched from the memory 260. Preferably, in the embodiment, an auto phase correction unit is disposed in the memory interface unit 270 in the timing controller 250. The auto phase correction unit adjusts the phase of a sampling clock of a read signal of the memory 260 to ensure the correctness of fetched data.

Figure 3:
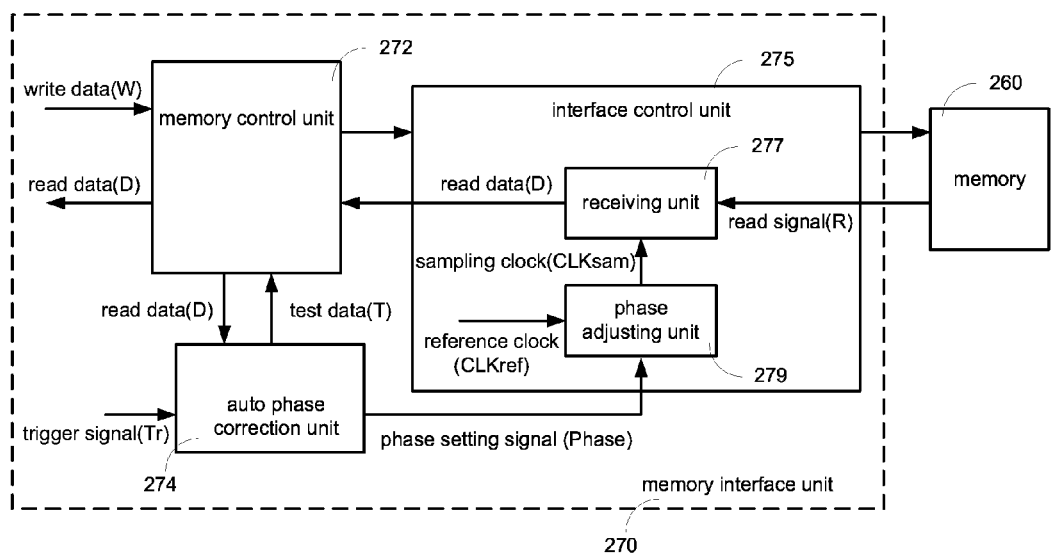
FIG. 3 is a schematic diagram of a memory interface unit.

FIG. 3 shows a schematic diagram of a memory interface unit. The memory interface unit 270 includes a memory control unit 272, an auto phase correction unit 274, and an interface control unit 275. The interface control unit 275 includes a receiving unit 277 and a phase adjusting unit 279.

In a normal read/write period of the memory 260, the memory control unit 272 temporarily stores write data W to the memory 260 via the interface control unit 275, i.e., the memory control unit 272 writes in frame data. Further, a phase setting signal Phase of the auto phase correction unit 274 controls the phase adjusting unit 279 to delay a reference clock CLKref by a preferred delay phase to form a sampling clock CLKsam. The receiving unit 277 then samples a read signal R outputted from the memory 260 according to the sampling clock CLKsam to obtain read data D, i.e., the receiving unit 277 reads frame data. The memory control unit 272 outputs the read data D to the overdrive circuit 280.

In a normal read/write period of the memory 260, the phase setting signal Phase outputted from the auto phase correction unit 272 remains unchanged, such that the phase adjusting unit 279 is only allowed to delay the reference clock CLKref by a preferred delay phase to form the sampling clock CLKsam. Further, the auto phase correction unit 274 does not generate test data T, and the read data D received by the memory control unit 272 is not transmitted to the auto phase correction unit 274, either.

In the embodiment, when the overdrive circuit 280 generates a trigger signal Tr to the memory interface unit 270, the memory interface unit 270 activates a calibration period of the memory 260 at this point. Preferably, between a time point at which data of one line is outputted to the display panel 130 and a time point at which data of a next line is outputted the display panel 130, i.e., a horizontal blanking interval, the timing controller 250 may activate the calibration period by the trigger signal Tr. Alternatively, in a period between a time point at which data of one frame is outputted to the display panel 130 and a time point at which data of a next frame is outputted to the display panel 130, i.e., a vertical blanking interval, the timing controller 250 may activate the calibration period by the trigger signal Tr.

In the calibration period of the memory 260, the auto phase correction unit 274 generates the test data T to the memory control unit 272. The memory control unit 272 first temporarily writes the test data T to the memory 260 and later fetches the test data T. During the read process, the auto phase correction unit 274 controls the phase adjusting unit 279 by the phase setting signal Phase to generate a plurality of different delay phases for delaying the reference clock CLKref.

Each time after the phase adjusting unit 279 adjusts the delay phase of the reference clock CLKref to form the sampling clock CLKsam, the read data R is sampled by the sampling clock CLKsam to obtain the read data D (sampling result). Next, the memory control unit 272 outputs the read data D (sampling result) to the auto phase correction unit 274. The auto phase correction unit 274 then determines whether the read signal R can be correctly sampled by the delay phase according to a comparison result of the test data T and the read data D (sampling result).

When all the delay phases are tested and multiple test results are obtained, the auto phase correction unit 274 may select one of the delay phases as a preferred delay phase, which can be utilized in the normal read/write period of the memory 260.

Figure 4:
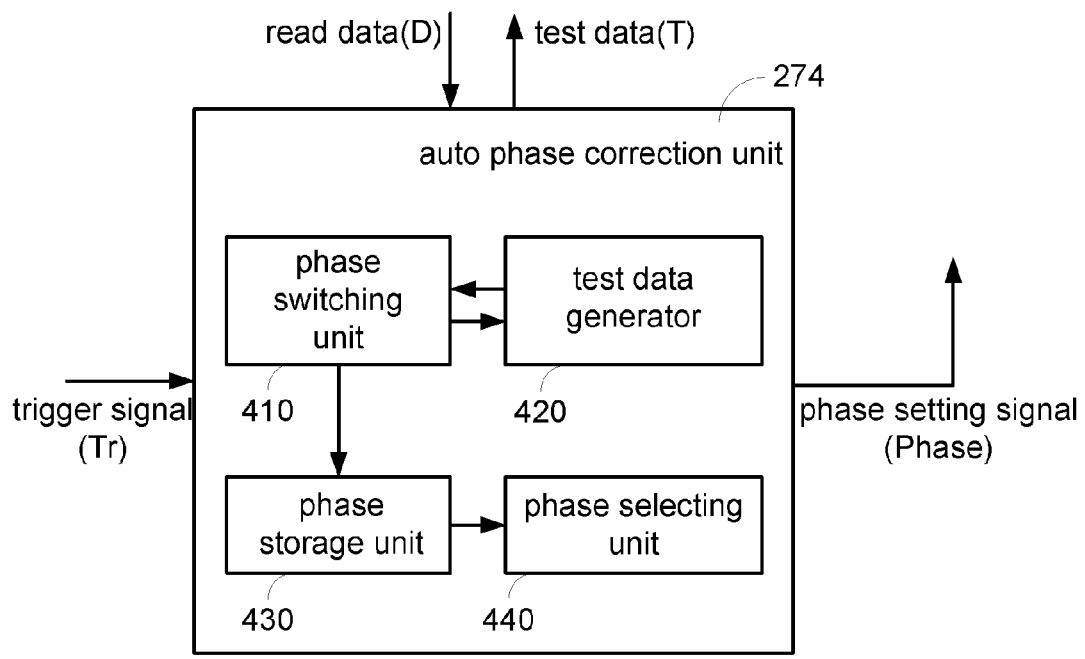
FIG. 4 is a schematic diagram of an auto phase correction unit.

FIG. 4 shows a schematic diagram of an auto phase correction unit. The auto phase correction unit 274 includes a phase switching unit 410, a test data generator 420, a phase storage unit 430, and a phase selecting unit 440.

Assume that the auto phase correction unit 274 provides eight delay phases for phase correction. When the auto phase correction unit 274 receives the trigger signal Tr, the test data generator 420 generates the test data T that is outputted to the memory control unit 272. The memory control unit 272 issues a write command that is temporarily stored in the memory 260 via the interface control unit 274.

The phase switching unit 410 accordingly controls the phase setting signal Phase, such that the phase adjusting unit 279 in the interface control unit 275 delays the reference clock CLKref by a first delay phase to generate the sampling clock CLKsam. When the memory control unit 272 issues a read command for fetching the previously written test data T, the receiving unit 277 samples the read signal R according to the sampling clock CLKsam to generate the read data D (sampling result) that is transmitted back to the auto phase correction unit 274.

The test data generator 420 generates a comparison result according to the test data T and the read data D (sampling result). When the test data T and the read data D (sampling result) are identical, a correct comparison result is obtained. Conversely, when the test data T is different from the read data D (sampling result), a failed comparison result is obtained. The phase storage unit 430 stores the current delay phase and the corresponding comparison result.

After the phase switching unit 410 generates eight delay phases and the phase storage unit 430 records the eight corresponding comparison results, according to the delay phases corresponding to multiple correct comparison results recorded in the phase storage unit 430, the phase selection unit 440 selects a preferred delay phase for the use of the memory 260 in the normal read/write period.

Figure 5:
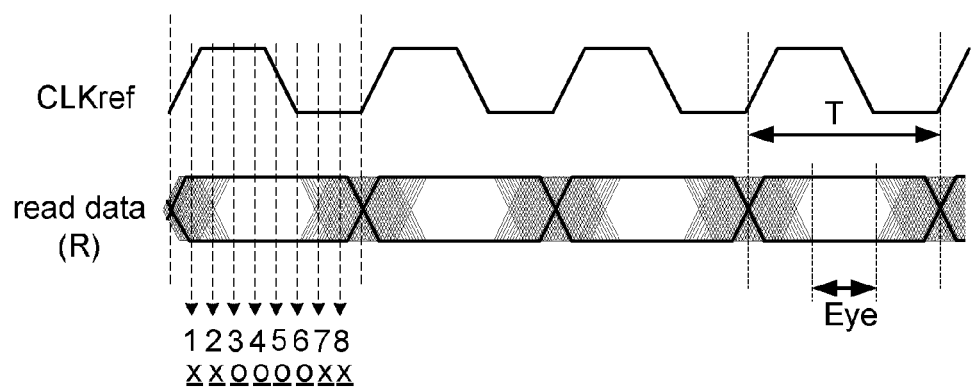
FIG. 5 is a schematic diagram of associated signals in a timing controller in a panel display system according to an embodiment of the present invention.

FIG. 5 shows a schematic diagram of associated signals in a timing controller of a display panel system according to an embodiment of the present invention. The memory 260 is a single data rate (SDR) memory that outputs the read signal R. The read signal R has a period that is a half of the reference clock signal period T, and an eye in which correct read data D can be sampled.

Known from FIG. 5, the phase switching unit 410 is capable of controlling eight delay phases 1 to 8. When the reference clock CLKref is delayed by the $1^{st}$ delay phase 1, a failed comparison result x is obtained. When the reference clock CLKref is delayed by the $2^{nd}$ delay phase 2, a failed comparison result x is obtained. When the reference clock CLKref is delayed by the $3^{rd}$ delay phase 3, a correct comparison result o is obtained. When the reference clock CLKref is delayed by the $4^{th}$ delay phase 4, a correct comparison result o is obtained. When the reference clock CLKref is delayed by the $5^{th}$ delay phase 5, a correct comparison result o is obtained. When the reference clock CLKref is delayed by the $6^{th}$ delay phase 6, a correct comparison result o is obtained. When the reference clock CLKref is delayed by the $7^{th}$ delay phase 7, a failed comparison result x is obtained. When the reference clock CLKref is delayed by the $8^{th}$ delay phase 8, a failed comparison result x is obtained.

Thus, the phase selecting unit 440 selects one of the delay phases corresponding to the four correct comparison results as a preferred delay phase. For example, the phase selecting unit 440 selects the $4^{th}$ delay phase 4 and utilizes the $4^{th}$ delay phase 4 in the normal read/write period of the memory 260.

It should be noted that, the above SDR memory and associated signals are utilized as an example in the non-limiting embodiment for explaining the present invention. One person skilled in the art may also utilize a DDR memory or other types of memories to implement the present invention.

Figure 6:
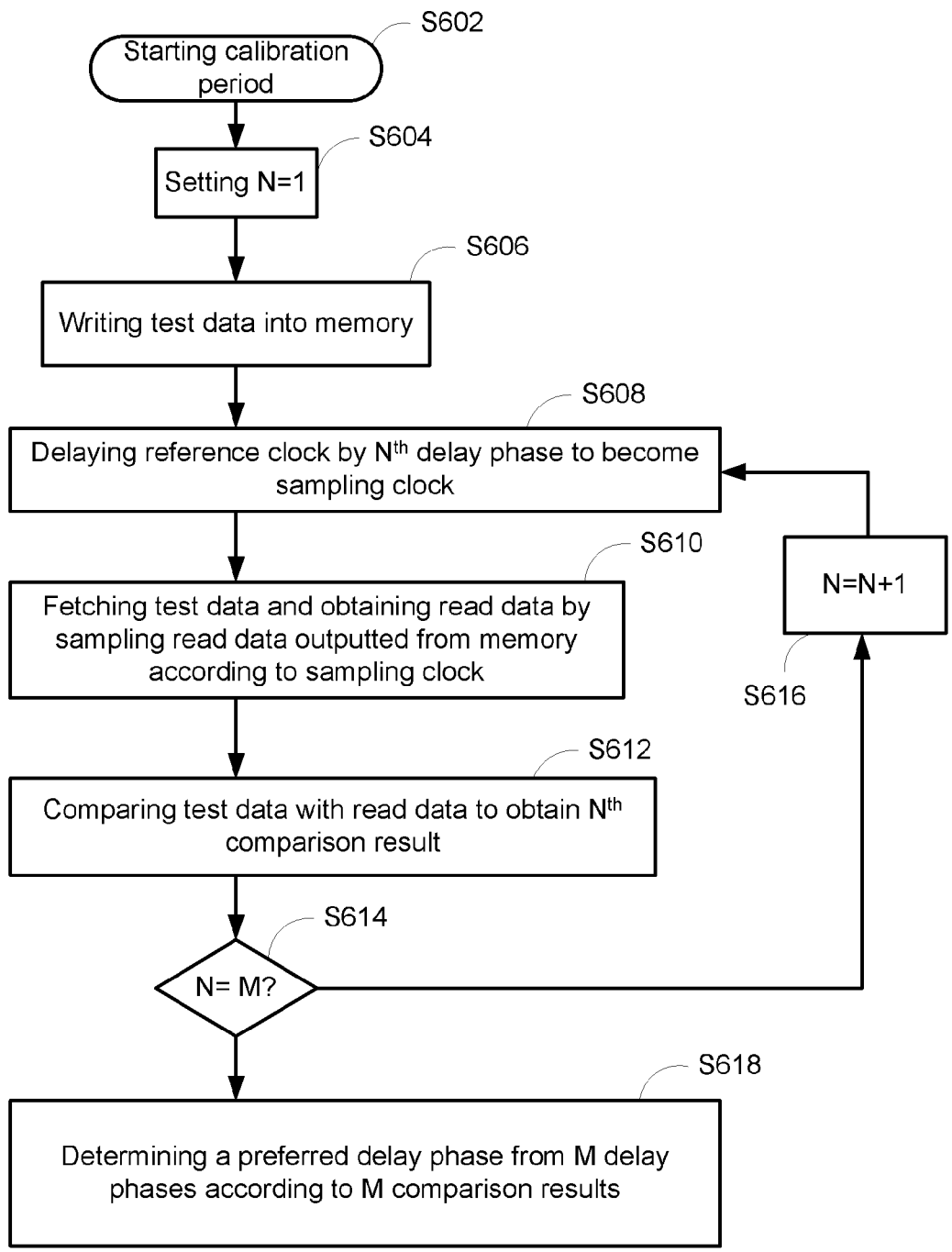
FIG. 6 is a flowchart of a control method for a timing controller in a panel display system according to an embodiment of the present invention.

FIG. 6 shows a flowchart of a control method for a timing controller in a panel display system according to an embodiment of the present invention. When the auto phase correction unit 274 receives the trigger signal Tr generated by the overdrive circuit 280, the calibration period of the memory 260 starts (step S602). Next, N is set to equal to 1 (step S604) and the test data T is written into the memory 260 (step S606).

With the control of the phase switching unit 410, the reference clock CLKref is delayed by an $N^{th}$ delay phase to become the sampling clock CLKsam (step S608). Next, when fetching the test data T, the read signal R outputted from the memory 260 is sampled according to the sampling clock CLKsam to obtain the read data D (sampling result) (step S610). The read data D (sampling result) and the test data T are compared to obtain an $N^{th}$ comparison result (step S612).

Next, it is determined whether N is equal to M (step S614). When the condition is not satisfied, N is increased and updated to N+1, and step S608 is iterated. When the condition is satisfied, a preferred delay phase is determined from M delay phases according to M comparison results (step S618), and is utilized in a normal read/write period of the memory 260.

It is known from the above description that, an auto phase correction unit implemented by a hardware design is added into the memory interface unit in the timing controller. With auto correction tests, applicable delay phases can be quickly identified, and a preferred delay phase can be determined and applied to a subsequent normal read/write period of the memory. Therefore, normal operation capabilities of the timing controller can be sustained when the timing controller experiences a PVT effect, ESD or other events.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A timing controller, applied in a panel display system, the timing controller being coupled between a display controller and a display panel, the timing controller comprising:
    an image signal receiver, configured to receive an image signal outputted from the display controller;
    an overdrive circuit, configured to receive the image signal, and to generate a converted image signal according to successive first frame data and second frame data in the image signal;

an image signal transmitter, configured to receive the converted image signal outputted from the overdrive circuit and to transmit the converted image signal to the display panel;

a memory; and a memory interface unit;

wherein, in a normal read/write period, the memory interface unit receives the first frame data outputted from the overdrive circuit and stores the first frame data in the memory, and when the overdrive circuit receives the second frame data in the image signal, the memory interface unit fetches the first frame data from the memory according to a preferred delay phase and transmits the first frame data to the overdrive circuit; and in a memory calibration period, the memory interface unit adjusts a delay phase of a reference clock a number of times, accordingly samples a read signal outputted from the memory to obtain a plurality of sampling results, and determines the preferred delay phase according to the sampling results.

2. The timing controller according to claim 1, wherein the image signal receiver is a low-voltage differential signaling (LVDS) receiver.

3. The timing controller according to claim 1, wherein the image signal transmitter is a mini-low-voltage differential signaling (mini-LVDS) transmitter.

4. The timing controller according to claim 1, wherein the memory interface comprises:

a memory control unit;

an interface control unit; and an auto phase correction unit;

wherein, in the normal read/write period, the memory control unit receives the first frame data, the interface control unit receives and stores the first frame data into the memory, and delays the reference clock by the preferred delay phase for fetching the first frame data, and the auto phase correction unit receives a trigger signal outputted from the overdrive circuit in order to enter the memory calibration period; and in the memory calibration period, the auto phase correction unit generates test data, stores the test data into the memory via the memory control unit and the interface control unit, controls the interface control unit to adjust the delay phase of the reference clock a number of times when fetching the test data from the memory to accordingly sample the read signal to obtain the sampling results, obtains a plurality of comparison results by comparing the sampling results and the test data, and determines the preferred delay phase according to the comparison results.

5. The timing controller according to claim 4, wherein the interface control unit comprises:

a phase adjusting unit, configured to receive a phase setting signal of the auto phase unit and to delay the reference clock to a plurality of sampling clocks; and a receiving unit, configured to sample the read signal according to the sampling clocks and to generate the sampling results.

6. The timing controller according to claim 5, wherein the auto phase correction unit comprises:

a test data generator, configured to generate the test data and to output the test data to the memory control unit, and to generate the comparison results according to the sampling results and the test data;

a phase switching unit, configured to control the phase setting signal such that the phase adjusting unit delays the reference clock to the sampling clocks according to the phase setting signal;

a phase storage unit, configured to store the comparison results; and a phase selecting unit, configured to determine the preferred delay phase according to the comparison results.

7. The timing controller according to claim 6, wherein when the test data and one of the sampling results are identical, a correct comparison result is obtained; when the test data is different from another of the sampling results, a failed comparison result is obtained; and the phase selecting unit determines the preferred delay phase according to the correct comparison results in the comparison results.

8. The timing controller according to claim 1, wherein the converted image signal comprises a horizontal synchronization signal and a vertical synchronization signal; the overdrive circuit activates the memory calibration period in a horizontal blanking interval of the horizontal synchronization signal or a vertical blanking interval of the vertical synchronization signal.

9. A control method for a timing controller in a panel display system, applied to a memory interface unit in the timing controller, the control method comprising:

in a memory calibration period, writing test data into a memory;

delaying a reference clock by a plurality of delay phases into a plurality of delayed reference clocks, respectively;

obtaining a plurality of sampling results by sampling a read signal outputted from the memory according to the delayed reference clocks, respectively;

comparing the sampling results with the test data to obtain a plurality of comparison results;

and determining a preferred delay phase according to the comparison results, wherein an overdrive circuit in the timing controller determines the memory calibration period and a memory normal read/write period.

10. The control method according to claim 9, wherein in the memory normal read/write period, the memory interface unit in the timing controller controls the reference clock to be delayed by the preferred delay phase to sample the read signal outputted from the memory.

11. The control method according to claim 9, wherein in the memory normal read/write period, the overdrive circuit converts an image signal to a converted image signal.

12. The control method according to claim 11, wherein the converted image signal comprises a horizontal synchronization signal and a vertical synchronization signal; the overdrive circuit determines the memory calibration period in a horizontal blanking interval of the horizontal synchronization signal or a vertical blanking interval of the vertical synchronization signal.

13. The control method according to claim 11, wherein the image signal is a low-voltage differential signal.

14. The control method according to claim 11, wherein the converted image signal is a mini-low-voltage differential signal.

15. The control method according to claim 9, wherein when the test data and one of the sampling results are identical, a correct comparison result is obtained; when the test data is different from another of the sampling results, a failed comparison result is obtained.

16. The control method according to claim 15, wherein the preferred delay phase is determined according to the correct comparison results.

\* \* \* \* \*